United States Patent
Gore

(10) Patent No.: US 6,245,137 B1
(45) Date of Patent: Jun. 12, 2001

(54) SURFACTANTS FOR IMPROVED INK-JET PERFORMANCE

(75) Inventor: Makarand P. Gore, Corvallis, OR (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/303,811

(22) Filed: Apr. 30, 1999

(51) Int. Cl.$^7$ .................................................. C09D 11/00
(52) U.S. Cl. ..................................... 106/31.59; 106/31.89
(58) Field of Search ............................... 106/31.59, 31.89

(56) References Cited

U.S. PATENT DOCUMENTS

| | | | |
|---|---|---|---|
| 4,783,220 | 11/1988 | Gamble et al. | 106/31.59 |
| 5,085,698 | 2/1992 | Ma et al. | 524/388 |
| 5,626,654 | 5/1997 | Breton et al. | 106/31.33 |
| 5,633,109 | 5/1997 | Jennings et al. | 430/115 |
| 5,743,945 | 4/1998 | Yamashita et al. | 106/31.58 |
| 5,788,749 | 8/1998 | Brenton et al. | 106/31.6 |

FOREIGN PATENT DOCUMENTS

0881270A2  12/1998  (EP) ............................... C09D/11/00

OTHER PUBLICATIONS

J.N. Israelachvili et al. "Physical Principles of Membrane Organization", Quarterly Reviews of Biophysics X3, 2 (1980), pp. 121–200.

*Primary Examiner*—Helene Klemanski
*Assistant Examiner*—Veronica F. Faison

(57) ABSTRACT

The present invention relates to surfactants that help improve image quality attributes, in particular chroma (i.e., color saturation), and ink-jet inks formulated with the same to produce inks exhibiting more than one of the desirable properties such as improved chroma, bleed control, edge acuity, and surface retention, thereby improving image quality. More specifically, the invention relates to surfactants that form relatively large aggregated structures (micelles) of geometry other than spherical, hence fourth referred to as lamellae forming surfactants.

7 Claims, No Drawings

SURFACTANTS FOR IMPROVED INK-JET PERFORMANCE

FIELD OF INVENTION

The present invention generally relates to inks, and more particularly, ink-jet ink compositions for improved image quality.

BACKGROUND OF THE INVENTION

The use of ink-jet printing systems has grown dramatically in recent years. This growth may be attributed to substantial improvements in print resolution and overall print quality, coupled with appreciable reduction in cost. Today's ink-jet printers offer acceptable print quality for many industrial, commercial, business, and residential applications at costs fully an order of magnitude lower than comparable products available just a few years ago. Notwithstanding their recent success, intensive research and development efforts continue toward improving the print quality of ink-jet images. Thus, challenge remains to further improve the performance of the ink-jet inks.

SUMMARY OF THE INVENTION

Generally, surfactants are molecules containing two distinct regions that can be classified as hydrophobic (oil-like, which do not favorably associate with water) and hydrophilic (water-like, that associate with water favorably). Surfactants may generally be described by Formula I, wherein $R_1$ is a hydrophobic group; L is a linking group which can be simply part of a molecule such as methylene, ether, ester or amide linkage; and $R_2$ is a hydrophilic group such as repeating units of ethylene glycol. It is known that use of surfactants in inks can improve attributes such as bleed control (or bleed alleviation). However, surfactants that improve chroma or color saturation are hereto unknown. The present invention relates to surfactants that help improve several of the image quality attributes, in particular chroma (i.e., color saturation), and ink-jet inks formulated with the same to produce inks exhibiting desirable properties such as improved chroma, bleed control, edge-acuity, and surface retention, thereby improving image quality.

Without subscribing to any particular theory, it is expected that surfactants that rapidly form large aggregate structures such as bilayers or vesicles on the surface of the media during the drying of ink film are useful in the practice of the invention. These structures (e.g., lamallae or vesicles) are not necessarily present in the inks but are formed at some point during drying of the solvents, thus resulting in the observed enhanced print attributes. The general description of surfactant behavior and expected critical packing parameter values is described below.

The colorants may be dye-based or pigment-based. As used herein, the term "pigment" refers to a colorant that is insoluble in the aqueous vehicle, and includes disperse dyes as well has pigments that are either dispersed with the aid of a dispersant or those that are self-dispersed.

The purity of all components is that employed in normal commercial practice for ink-jet ink compositions. Weight percents represent percent of the total ink composition, unless otherwise indicated.

DETAILED DESCRIPTION OF THE INVENTION

The present invention is directed to ink-jet inks formulated with surfactants capable of forming lamella phase, exhibiting improved image quality such as increased chroma, greater edgeacuity, enhanced bleed alleviation, and surface retention, across a range of media, when used in ink-jet inks for use in commercially available ink-jet printers such as DESKJET® printers, manufactured by Hewlett-Packard Company, of Delaware; and other commercially available home or office ink-jet printers.

Generally, surfactants are molecules containing two distinct regions that can be classified as hydrophobic (oil-like, that do not favorably associate with water) and hydrophilic (water-like, that associate with water favorably). It is known to those conversant in the art that use of surfactants in the inks can improve some attributes such as bleed alleviation. However, surfactants that improve chroma or color saturation are hereto unknown. The present invention relates to surfactants that help improve several of the image quality attributes, in particular chroma (i.e., color saturation), and ink-jet inks formulated with the same to produce inks exhibiting more than one of the desirable properties such as improved chroma, bleed control, edge-acuity, and surface retention, thereby improving image quality. More specifically, the invention relates to surfactants that form relatively large aggregated structures (micelles) of geometry other than spherical, hence fourth referred to as lamellae forming surfactants. Especially, surfactants that form lamellae or vesicle (bilayer) structures at some point during drying of the solvent are expected and noted to show these print attributes. Furthermore, it is not necessary for the present surfactants to exist in lamellae or vesicle form in the ink itself. The present surfactants have critical packing parameter (CPP—see Equation I) in a range from about ⅓ to 1.0; more preferably, from about 0.5 to about 1.0; and most preferably, from about 0.8 to about 1.0. Description of relation of surfactant behavior and critical packing parameter is available in literature such as "Surfactant Science technology by Drew Myres, 1088, VCH Publishers Inc. New Yrk, ISBN 0-89573-339-0. Although some surfactants that form vesicles show similar behavior, the invention does not necessarily require that vesicles be present in the inks.

The surfactants of the present invention are capable of forming large structures (e.g., lamellae phase) upon losing (e.g., drying-off) of the solvent on the print medium, the shape of which structure is determined by Equation I:

$$V_H/l_c a_0 = \frac{1}{3} \text{ to } 1, \qquad \text{Equation I}$$

Wherein
$V_H/l_c a_0$ is the critical packing parameter (CPP);
$V_H$ is the volume occupied by the hydrophobic groups in the micellar core,
$L_c$ is the length of the hydrophobic group (tail) in the core, and
$a_0$ is the cross-sectional area occupied by the hydrophilic group (head) at the micelle-solution interface.

The surfactants of the present invention have, bulky, hydrophobic groups, and small, close-packed hydrophilic groups and will tend to form lamellar or cylindrical micelles in aqueous media at some concentration in their phase diagram, which may not be the same as their concentration in ink.

Examples of surfactants capable of forming large structures (e.g., lamella phase) include, but are not limited to, surfactants wherein $R_1$ hydrophobic group (see Formula I) is a group or backbone with several groups of eight to fifty carbon units (C8–C50), e.g. steroidal such as cholesterol, stigmasterol, and derivatives thereof. Other surfactants expected to be within the scope of the present invention include those wherein $R_1$ is a set of two or more hydrophobic chains of 8 to 50 methylene or methine units in the same molecule and have polyhydroxy back bone such as glycerol, glucose, sorbitan, sucrose, mannose backbone, which may also serve as hydrophilic group. Other hydrophobic groups such as vitamin E combined with polar groups such as succinate show similar properties. More specific examples, include:

$$R_1 — L — R_2 \qquad \text{Formula I}$$

wherein $R_1$ is Hydrophobic group of C8–C50; or sterol skeleton; or soy sterol; or fucosterol; or beta sitosterol; or campesterol; or stigmasterol; or cholesterol; or vitamin E; or sucrose disterate; or glyceryl C8–C50 esters, ethers amides; or sorbityl C8–C50 esters, esters, amides; or glucose C8–C50 esters, amides, ethers;

L is ether; ester; or amide; and $R_2$ is carboxylate salt; sulfate; or phosphate.

More specifically, the surfactants of the present invention are selected from the group consisting of Generol, cholesterol, and vitamin E, and those wherein the polar group is a carboxylate, succinate, or PEG 3-1000 derivative.

Specific examples of surfactants according to the present invention include, but are not limited to:

Formula II

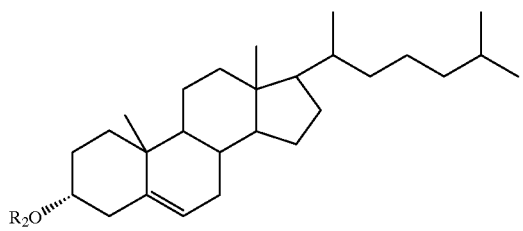

Wherein Formula II is:
Cholesterol ($R_2$ = H);
Triolin ($R_2$ = triethylene glycol).

Formula IV

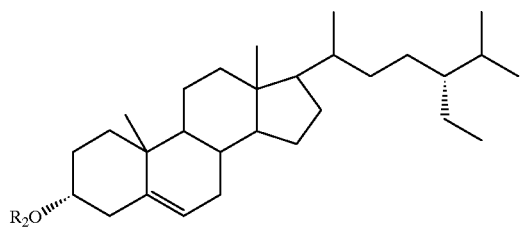

Wherein Formula IV is:
General 122E25 ($R_2$ = PEG 25).

Formula VI

Formula III

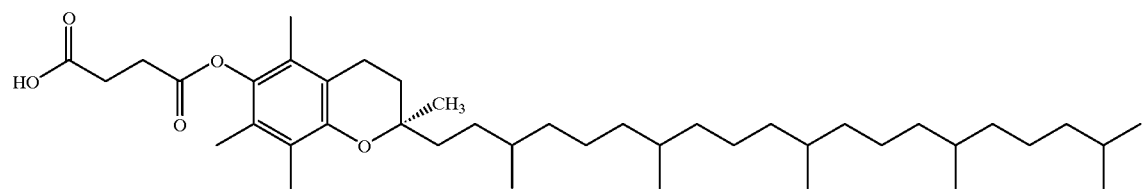

Wherein Formula III is:
Cholic acid ($R_2$ = COOH).

Formula V

Wherein Formula V is:
$R_2$ is polyethylene glycol, and
n = 3 to 1000.

Wherein Formula VI is:
Vitamin E-succinate.

AQEOUS VEHICLE

The aqueous carrier medium is water or a mixture of water and at least one water-soluble organic solvent. Selection of a suitable mixture depends on requirements of the specific application, such as desired surface tension and viscosity, the selected colorant, drying time of the ink, and the type of substrate onto which the ink will be printed. Representative water-soluble organic solvents that may be selected are disclosed in U.S. Pat. No. 5,085,698. A mixture of water and a polyhydric alcohol, such as diethylene glycol, is preferred as the aqueous carrier medium.

In the case of a mixture of water and at least one water-soluble solvent, the aqueous carrier medium usually comprises from about 30% to about 95% water. The preferred compositions are about 60% to about 95% water, based on the total weight of the aqueous carrier medium.

The amount of aqueous carrier medium in the ink is in the range from about 70 to about 99.8%, preferably from about 94 to about 99.8%, based on total weight of the ink when an organic pigment is selected; from about 25 to about 99.8%, preferably from about 70 to 99.8%, based on total weight of the ink when an inorganic pigment is selected; and from about 80 to about 99.8% when a dye is selected as the colorant.

COLORANT

The colorant may be a pigment or a dye, or a surface modified colorant such as those available from Cabot, Orient etc. (insoluble or soluble in the vehicle as the case may be) and can be any colorant that is not incompatible with any other ingredient in the ink. The inks of the present invention comprise from about 0.05 to about 20% colorant; preferably, from about 0.1 to about 8%; and more preferably, from about 0.5 to about 5%; by weight, based on the total weight of the ink.

OTHER INGREDIENTS

In the practice of the invention, other ingredients such as immobilizing agents; buffers; biocides; and other surfactants may optionally be employed in the inks.

In some instances, the printing system may further include a Reactant Fluid in addition to inks (i.e., a fluid containing at least one colorant, the ink absorbing in one or more (e.g., visible, IR, UV) regions)). As used herein, reactant fluid, is a fluid that is substantially devoid of color (i.e., the reactant fluid may contain no colorant at all, or it may contain a colorant that does not absorb in the visible light but may absorb in either or both IR or UV). The reactant fluid comprises a component (a molecule or complex, or a functional group in a molecule or complex) that is reactive with a component (a molecule or complex, or a functional group in a molecule or complex) in an ink thus providing for enhanced image integrity of printed areas created with the ink, such as, increased permanence (e.g. waterfastness, smearfastness) or bleed alleviation; improved color vibrancy, improved edge acuity, or reduced dry time; in the event that the reactant fluid and the ink are printed at least partially on a same pre-determined area on a print medium, or on predetermined areas adjacent one another on a print medium. Immobilizing agents are one example of such reactive components which may be used in the reactant fluid or in an ink. The reactant fluid is reactive with at least one ink, preferably, the inks formulated according to the present invention. Additionally, the reactant fluid may further comprise the surfactants of the present invention.

When the reactant fluid is used, the amount of reactant fluid (regardless of whether the reactant fluid further comprises the surfactants of the present invention) used to impart the desired image quality attribute may range from about 0.1 to about 4 times the amount of ink used in forming the image. The reactant fluid may be applied either or both before or after the application of the ink.

Examples of immobilizing agents for optional use in the fluids (either or both the ink and the reactant fluid) include:

precipitating agents such as inorganic salts (preferably divalent or trivalent salts of chloride and/or nitrate such as $Mg(NO_3)_2$, $Ca(NO_3)_2$, $CaCl_2$, $MgCl_2$, $AlCl_3$ and/or $Al(NO_3)_3$; organic acids such as succinic acid, citric acid, and morpholinoethane sulfonic acid; and polymeric cationic reagents such as PEI (polyethyleneimine).

Buffers may be used to modulate pH and they can be organic-based biological buffers, or inorganic buffers such as sodium phosphate. The buffer employed, preferably, provides a pH ranging from about 4 to about 9. Examples of preferably-employed organic buffers include Trizma Base, available from companies such as Aldrich Chemical (Milwaukee, Wis.), 4-morpholineethanesulfonic acid (MES), and 4-morpholinepropanesulfonic acid (MOPS).

Any of the biocides commonly employed in ink-jet inks may be employed in the practice of the invention, such as NUOSEPT 95, available from Hals America (Piscataway, N.J.); PROXEL GXL, available from Zeneca (Wilmington, Del.); and glutaraldehyde, available from Union Carbide Company (Bound Brook, N.J.) under the trade designation UCARCIDE 250.

EXAMPLES

Inks were formulated and different qualities of the formulated inks were measured in an effort to assess the benefits attained in the practice of the invention, namely, the effect on chroma.

Two groups of inks were used. The two groups contained the same general ingredients such as at least one colorant, an aqueous vehicle, and optional ingredients, as described above, differing only in the presence of the surfactants of the present invention: The first group (the control) did not contain the surfactants of the present invention, while the second group contained the surfactants of the present invention.

Print samples of formulated inks, where necessary, were generated using a Hewlett-Packard DeskJet® printer. The print media used included uncoated paper such as Gilbert Bond paper manufactured by Mead.

The Chroma (C) for each of the inks was determined by dissolving about 1 to about 5 wt % of the colorant in the desired ink vehicle. The desired absorbance at the lambda maximum for each ink was about 0.10 to 0.20 for a 1:10,000 dilution. A color block for each ink was printed at full density on plain paper. The L*, a*, and b* values were measured using a commercially available colorimeter such as Hunter Ultrascan available from Hunter Associates Laboratories, Reston, Va., USA. The chroma was then calculated according to Equations 2 below, and the data is reported in Table 1, below.

$$C^* = (a^{*2} + b^{*2})^{1/2} \qquad \text{Equation 2}$$

TABLE I

| Ink | Chroma | |
|---|---|---|
| | Control (Group I) | Inks of Present Invention (Group II) |
| Cyan | 45 | 48 |
| Yellow | 77 | 82 |

TABLE I-continued

| | Chroma | |
|---|---|---|
| Ink | Control (Group I) | Inks of Present Invention (Group II) |
| Magenta | 62 | 66 |
| Red | 52 | 57 |
| Green | 59 | 58 |
| Blue | 39 | 45 |

As can be seen from the data in Table I, inks formulated according to the present invention exhibited improved chroma.

What is claimed is:

1. An ink-jet fluid composition comprising:
   at least one large structure forming, non-vesicle forming surfactant, wherein the large structure has a critical packing parameter in a range from about 0.8 to about 1.0.

2. The fluid of claim 1 wherein the surfactant has formula $R_1$—L—$R_2$ wherein
   $R_1$ is a hydrophobic moiety comprising a group or backbone with more than one group comprising of C8–C50; or a set of at least two hydrophobic chains of about 8 to about 50 methylene or methine units in the same molecule and having a polyhydroxy back bone;
   L is linking group; and
   $R_2$ is a hydrophilic moiety.

3. The fluid of claim 2 wherein
   $R_1$ is selected from the group consisting of sterol skeleton; soy sterol; fucosterol; beta sitosterol; campesterol; stigmasterol; cholesterol; vitamin E; sucrose disterate; glyceryl C8–C50 esters and ethers amides; sorbityl C8–C50 esters, esters, and amides; and glucose C8–C50 esters, amides, and ethers.

4. The fluid of claim 2 wherein
   L is ether, ester, or amide.

5. The fluid of claim 2 wherein
   $R_2$ is carboxylate salt, sulfate, or phosphate.

6. The fluid of claim 2 wherein
   $R_1$ is selected from the group consisting of cholesterol and vitamin E and, wherein the hydrophilic moiety is a carboxylate or succinate.

7. The fluid as in any of claims 1 through 6 wherein the fluid is a reactant fluid further comprising an immobilizing agent.

* * * * *